(12) United States Patent
Kujawski

(10) Patent No.: US 10,786,106 B2
(45) Date of Patent: Sep. 29, 2020

(54) FRUIT PRESS FOR DISPENSING PRESSED JUICE TO BEVERAGES AND METHOD FOR DISPENSING PRESSED JUICE

(71) Applicant: Bryan Kujawski, Jackson, WY (US)

(72) Inventor: Bryan Kujawski, Jackson, WY (US)

( * ) Notice: Subject to any disclaimer, the term of this patent is extended or adjusted under 35 U.S.C. 154(b) by 154 days.

(21) Appl. No.: 16/164,946

(22) Filed: Oct. 19, 2018

(65) Prior Publication Data
US 2019/0117003 A1 Apr. 25, 2019

Related U.S. Application Data

(60) Provisional application No. 62/575,702, filed on Oct. 23, 2017.

(51) Int. Cl.
*A47J 19/02* (2006.01)
*B30B 9/10* (2006.01)

(52) U.S. Cl.
CPC ............... *A47J 19/02* (2013.01); *B30B 9/10* (2013.01)

(58) Field of Classification Search
CPC .......... A47J 31/46; A47J 19/005; A47J 19/02; A47J 19/022; A47J 19/06; A23L 2/04; A23L 2/06; A23N 1/003; B65D 23/04; B65D 25/38; B65D 23/12
See application file for complete search history.

(56) References Cited

U.S. PATENT DOCUMENTS

| | | | |
|---|---|---|---|
| 594,728 A * | 11/1897 | Cox et al. | A47J 31/06 100/98 R |
| 1,835,966 A | 12/1931 | Pochyla | |
| 2,151,500 A * | 3/1939 | Cecil | A47J 19/023 100/213 |
| 2,829,586 A * | 4/1958 | Morris | A47J 19/02 100/133 |
| 3,464,344 A | 9/1969 | Hawthorne | |
| D374,617 S | 10/1996 | Petrucci et al. | |
| D468,595 S | 1/2003 | Lillelund et al. | |
| 7,000,535 B2 | 2/2006 | Harrison-Griffin et al. | |
| D695,073 S | 12/2013 | Franco | |
| 2006/0162578 A1 | 7/2006 | Zellmer et al. | |
| 2011/0089136 A1 | 4/2011 | Fukai | |
| 2012/0312176 A1 | 12/2012 | Ippolito et al. | |
| 2014/0144937 A1 | 5/2014 | Arsena-Armstrong | |

* cited by examiner

*Primary Examiner* — Hong T Yoo
(74) *Attorney, Agent, or Firm* — Rachel H. Huffstetler; FisherBroyles, LLP

(57) ABSTRACT

A fruit press device for pressing fruit and dispensing the pressed fruit juice to a beverage includes a fruit press assembly, a pressed juice dispenser, and a securing member for securing the device to a beverage receptacle. The fruit press includes proximal and distal press members connected by a hinge. The distal press member is connected to the dispenser and is in open communication with the dispenser to dispense the pressed juice.

22 Claims, 12 Drawing Sheets

FRUIT PRESS FOR DISPENSING PRESSED JUICE TO BEVERAGES AND METHOD FOR DISPENSING PRESSED JUICE

CROSS-REFERENCE TO RELATED APPLICATIONS

This application claims the benefit of and priority to Provisional Patent Application Ser. No. 62/575,702 filed Oct. 23, 2017, the disclosure of which is herein incorporated by reference

FIELD OF THE INVENTION

The present invention is directed to a fruit press device for pressing fruit, such as a citrus wedge, and dispensing the juice from the fruit segment to the beverage for infusing the beverage. The present invention is also directed to a method for dispensing pressed juice to a beverage.

BACKGROUND OF THE INVENTION

Beverages are often enjoyed infused with fruit juice, particularly citrus fruits such as lemons, limes, or oranges. Beverages, such as water, sparkling water, soda, beer, or cocktails, to name a few, are commonly served with a citrus wedge. The fruit wedges are often served beside the beverage or positioned upon the lip of the beverage container (glass, bottle, etc.). The consumer then removes the citrus wedge and squeezes the wedge along its outer peel to release the juices into the beverage. This method of squeezing the fruit wedge with bare hands can be cumbersome and messy. Usually, the juices end up dripping does the outside of the beverage glass or bottle, or on the consumer's bare hands and the bare hands should be clean to contact the citrus wedge. The used citrus wedge must then be placed with bare hands into the beverage or otherwise discarded. Accordingly, the cleanliness of the outer peel of the citrus fruit wedge and the consumer's hands become particularly relevant.

SUMMARY OF THE INVENTION

It is, therefore, advantageous for a fruit press to press the fruit, such as a citrus wedge, and to dispense the pressed juices directly into the beverage without the juices coming into significant contact with the consumer's hand. It is also advantageous to press the fruit without the outer peel of the fruit contacting the beverage, without dribbling juice outside of the beverage and without the consumer's hand contacting the fruit during the pressing process. The device also secures the pressed fruit remote from the beverage after it has been pressed.—Additionally, the device keeps the fruit wedges out of bottles, which then make the bottles better adapted for recycling. Without use of this device, the fruit wedge is normally pressed into the bottle, which impedes and/or interferes with the glass bottle recycling process These and other objectives are met by the present invention.

The present invention overcomes shortcomings of the prior art by providing a novel fruit press device including a fruit press for pressing the fruit or fruit segment, such as a citrus wedge, a dispenser for dispensing the pressed juices to the beverage, and a securing member for securing the device to the beverage receptacle.

The fruit press for pressing the fruit includes a proximal press member and a distal press member with a hinge connected therebetween. The distal press is operatively connected to the proximal end of the dispenser. The dispenser extends longitudinally from a bottom surface of the fruit press assembly and defines a central lumen. The distal press member defines an aperture in open communication with the dispenser central lumen. A fruit wedge is positioned between the proximal and distal press members and held in place by a flange defined by the proximal press member. The proximal press member and distal press member are then pressed together wherein the proximal press member pivots about the hinge. The pressed juice is dispensed through the distal press member aperture, into and along the length of the dispenser and into the beverage receptacle and/or beverage.

The hinge which connects the proximal and distal press members and permits relative movement therebetween so as to open and close the fruit press for receipt and removal of the citrus wedge. According to one aspect, the hinge includes an opening assembly which biases the distal press members in an open position. The opening assembly includes an arm for cooperating with a spring member to urge the proximal press, for example, proximally (upwardly). The hinge also includes a limiting assembly for limiting the extent to which the proximal and distal press members open relative to one another after engagement, such as its initial use, of the limiting assembly. The limiting assembly includes a second arm for cooperating with a toggle which engage one another to limit the degree of opening, for example, less than 100 degrees, or between 60-80 degrees.

According to one aspect, the fruit press device includes a securing member in the form of a clip for use with a bottle, glass, or can beverage receptacle. According to another aspect for use with a bottle, at least a first fin is provided to support the fruit press design within the open upper end of the bottle. According to a further aspect, at least one, or a pair, of additional fins are provided.

DETAILED DESCRIPTION OF THE INVENTION

Figure 1:
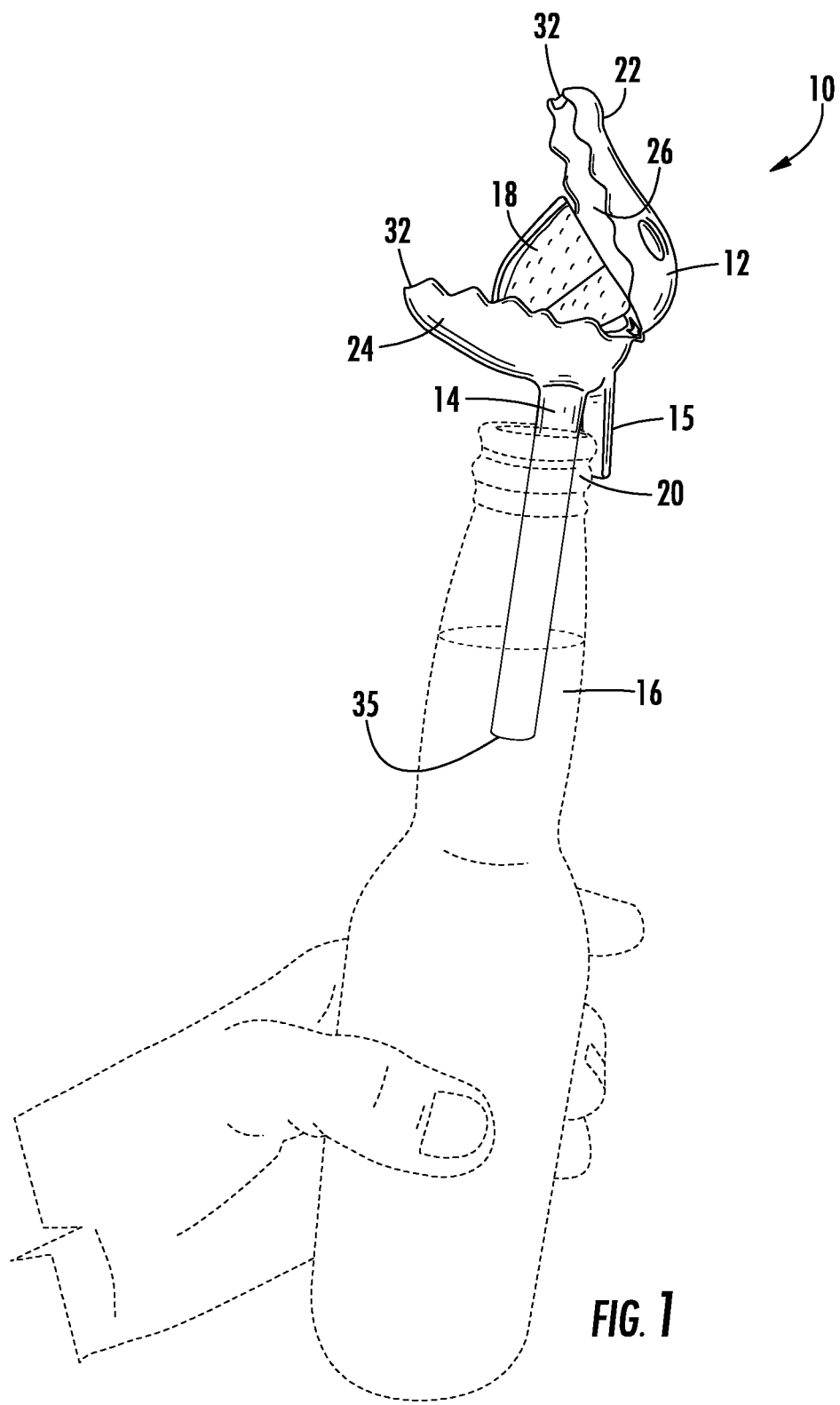
FIG. 1 is a perspective view of the fruit press device for dispensing fruit juice to a beverage positioned in a beverage bottle with a fruit positioned to be pressed.

The present invention will now be described in detail hereinafter by reference to the accompanying drawings. The invention is not intended to be limited to the embodiments described; rather, this detailed description is provided to enable any person skilled in the art to make and practice the invention.

As used herein, the term "fruit" is used to refer to any fruit or other food item which may be squeezed to produce juice including citrus and non-citrus fruits. Citrus fruits as described and shown are for illustrative and descriptive purposes and the fruits depicted in the drawings if provided by way of example and differently shaped fruit may be pressed. The terms "lateral" and "longitudinal" are used to refer to intersecting directions. The term "proximal" refers to the upper portion of a member or the device and term "distal" refers to the bottom portion of a member or the device. The term "transverse" direction refers to a direction which intersects the longitudinal axis, at any angle.

Figure 2:
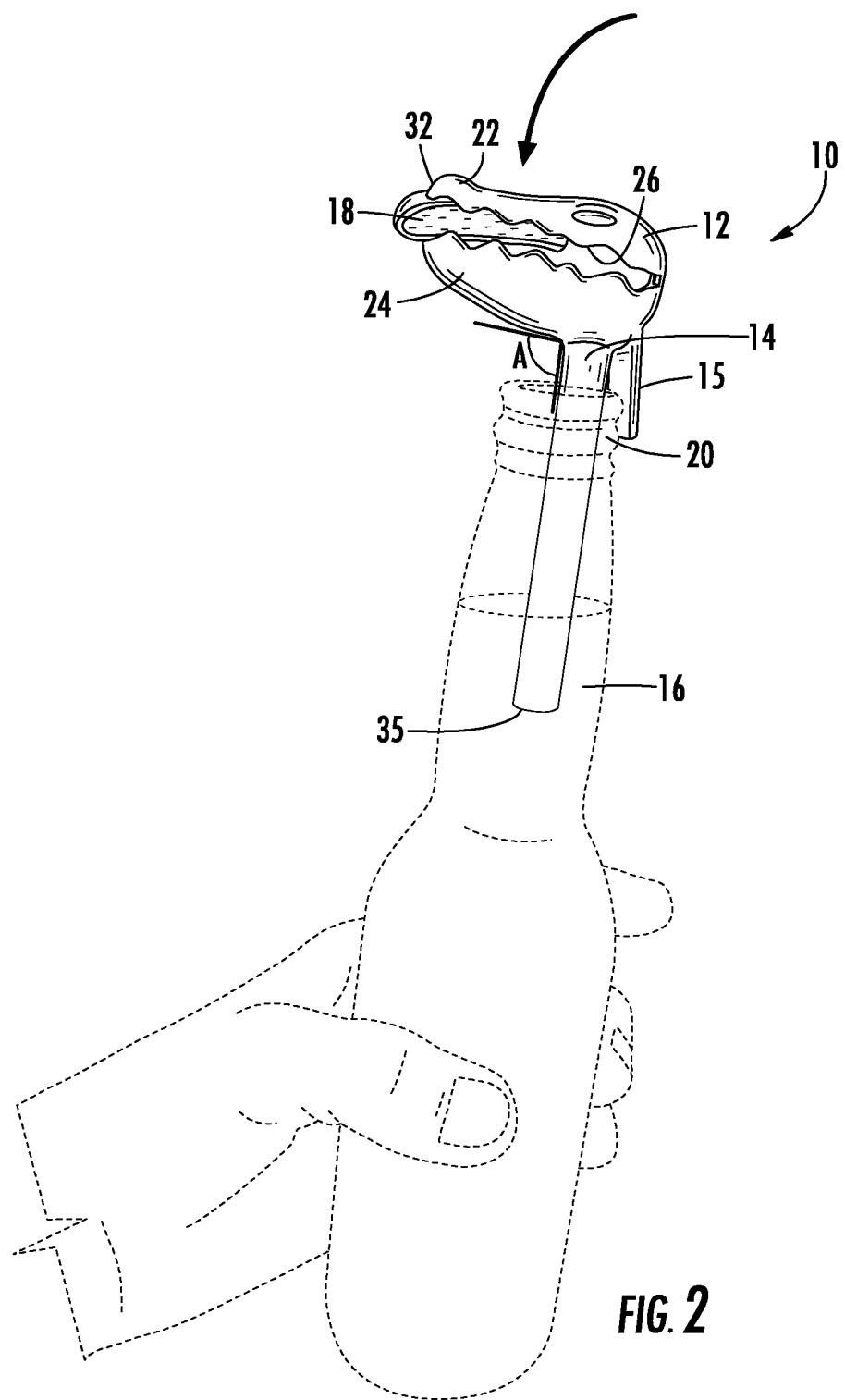
FIG. 2 is a perspective view of FIG. 1 with the fruit in a pressed position.
Figure 3:
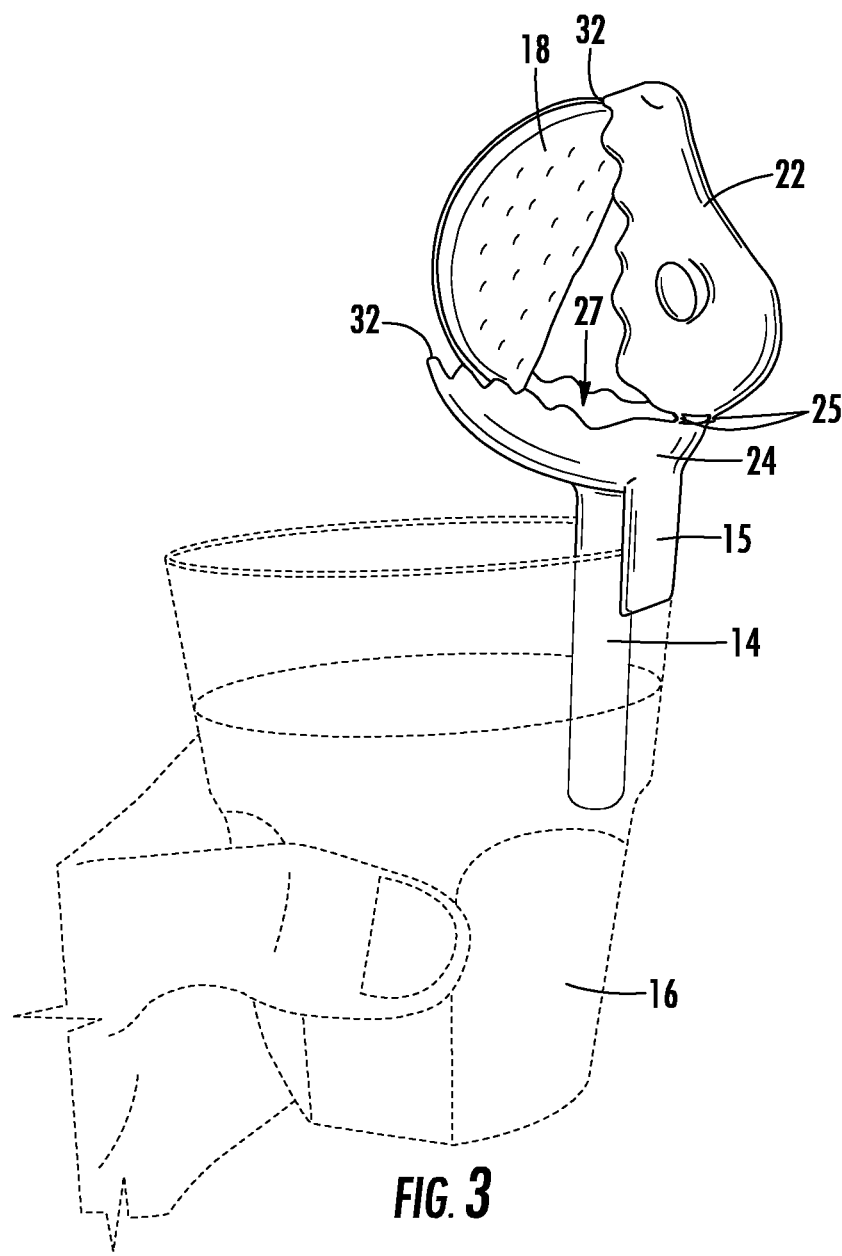
FIG. 3 is a side perspective view of the fruit press device for dispensing fruit juice to a beverage positioned in a drinking glass.

As shown in FIGS. 1 and 2, the fruit press device 10 for dispensing fruit juice to a beverage includes a fruit press assembly 12, a pressed juice dispenser 14 and a securing member 15 for securing the device 10 to a beverage receptacle 16. The press assembly 12 is configured for receipt of fruit, such as a citrus wedge 18, as shown. Of course, a whole fruit or other shaped fruit segment are also contemplated. The receptacle 16 shown in FIG. 1 is a bottle, but the device 10 may be used with any receptacle 16. The securing member 15 and dispenser 14 are configured for receipt of the beverage receptacle lip 20.

The press assembly 12 includes a proximal press member 22 and a distal press member 24. As shown, the proximal 22 and distal 24 press members are operatively connected, such as by a hinge 25 as best shown in FIGS. 5-9. The distal press member 24, as shown, is substantially rigidly connected to the proximal end of the dispenser 14. It is within the scope of the present disclosure to provide a distal press member 24 which is removably connected to the dispenser 14. For example, the distal press member 12 may be configured for removable receipt of the dispenser 14 such as by a form fitted support configured to receive the dispenser 14 or be received by the dispenser 14.

The proximal press member 22 and distal press member 24 are operatively connected by the hinge 25. As shown, the hinge 25 comprises a pair of hinges 25 spaced apart along the bottom, rear edge of the proximal press member 22 and the top, rear edge of the distal press member 24. This hinge 25 configuration is provided for the sake of discussion as other hinge configurations, a single hinge, or more than two hinges may be provided. The proximal press member 22 is moveable relative to the distal press member 24 between a first, disengaged position shown in FIG. 1 wherein the press members are opened for receipt of fruit, to a second engaged position shown in FIG. 2, wherein the fruit has been pressed. As shown, the press assembly 12 is representative of an animal head, but any decorative or non-decorative configuration may be utilized. As shown, the inwardly facing edges of the press members 22 are shown as having a teeth-like configuration, but these edges may be any desired shape, linear or non-linear.

Figure 6:
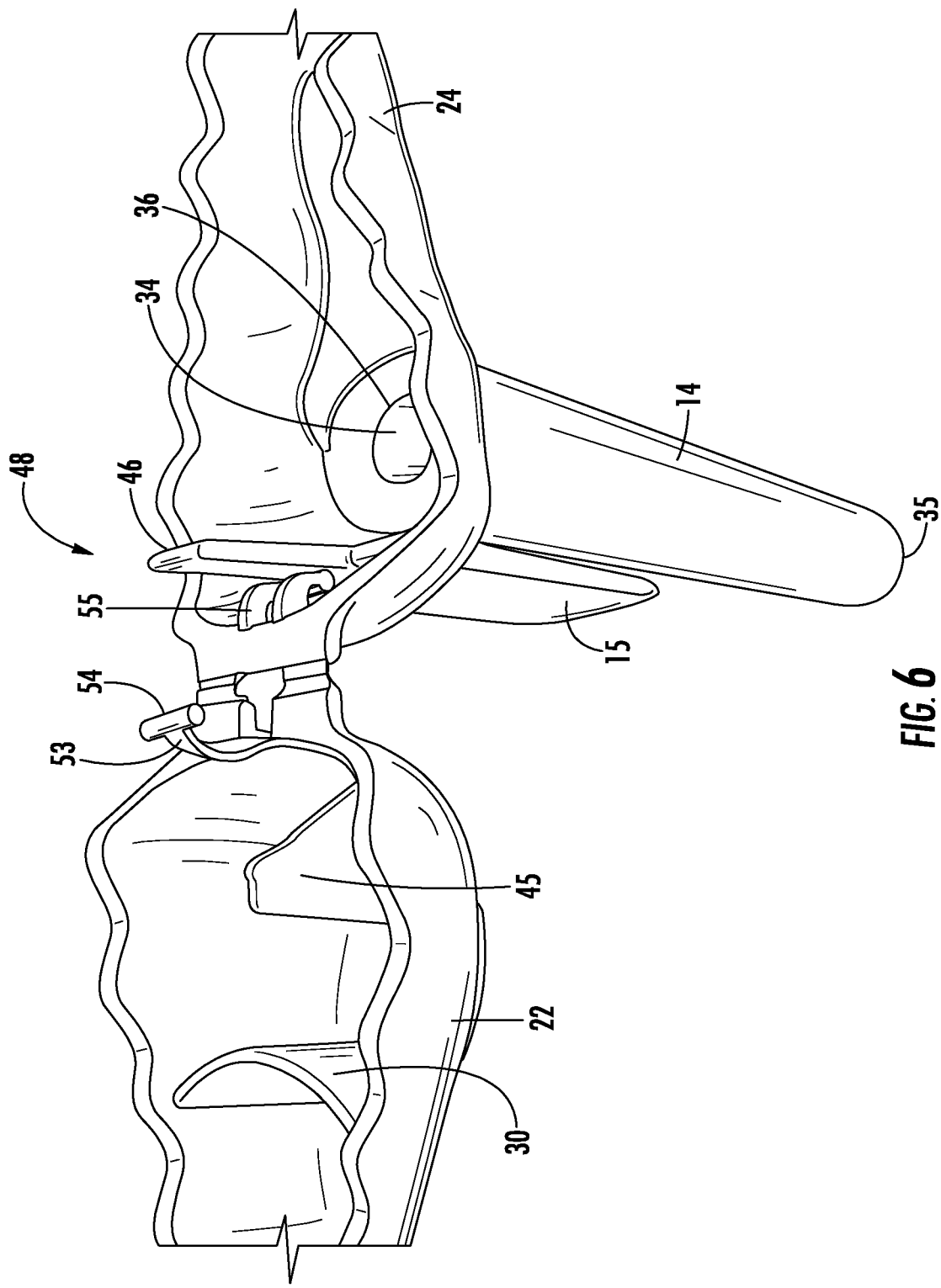
FIG. 6 is an enlarged view of the opening assembly and limiting assembly of the fruit press device according to one aspect.
Figure 7:
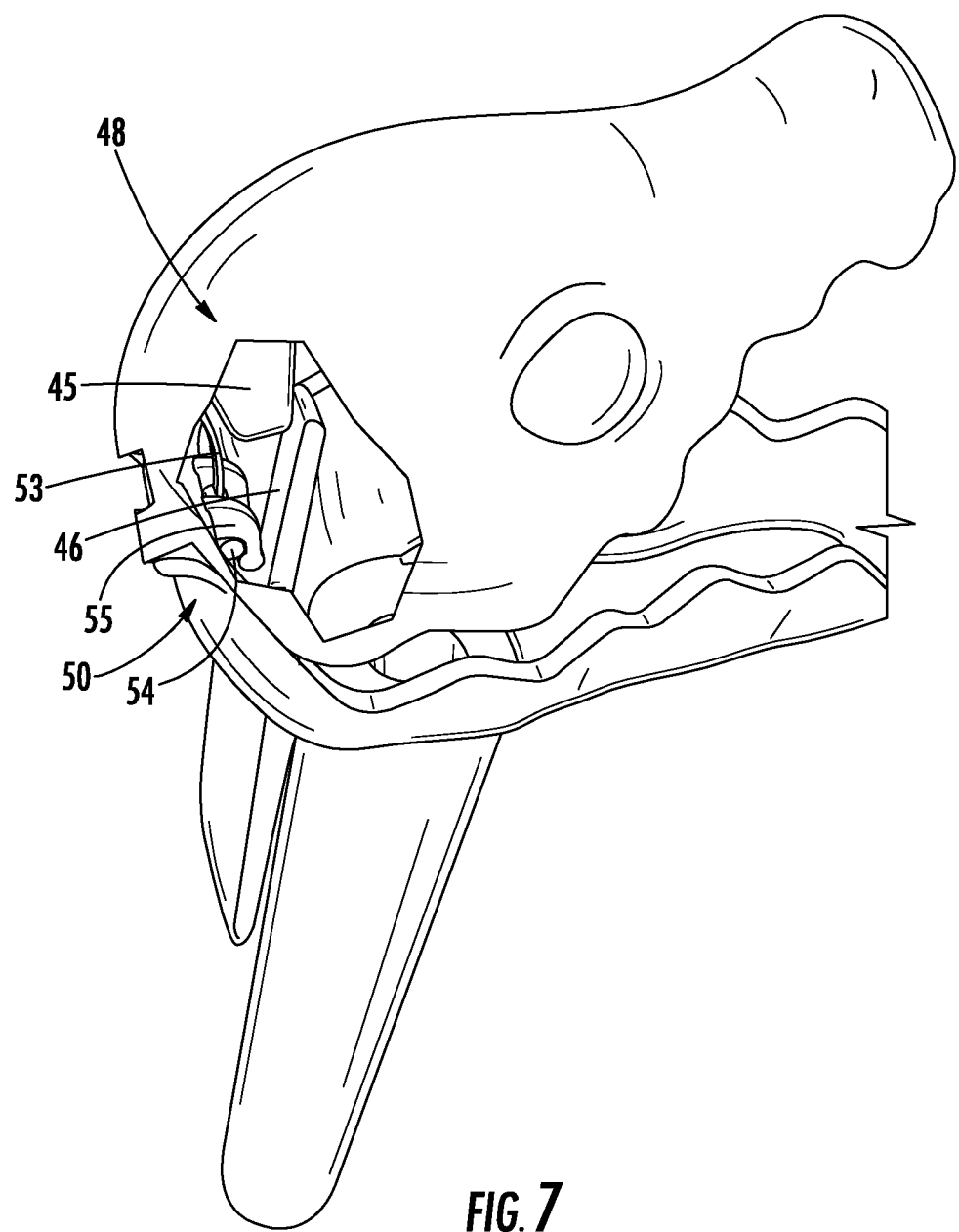
FIG. 7 is a partially cut-away view of FIG. 6.
Figure 8A:
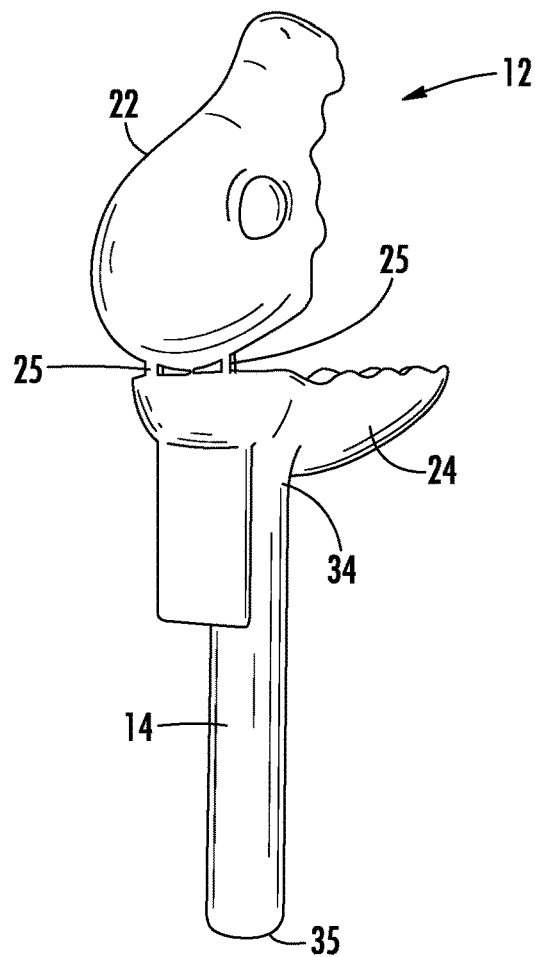
FIG. 8A is a rear perspective view of the of the fruit press device.
Figure 8B:
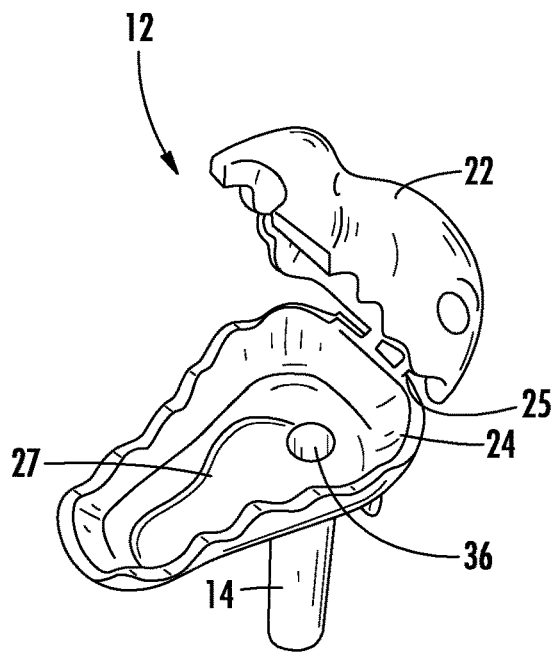
FIG. 8B is a front perspective view of the fruit press according to one aspect in an open position.

As shown in FIGS. 8A and 8B, according to one aspect of the present invention, the hinges 25 are defined by a pair of spaced apart hinges 25. As shown in FIGS. 5-7 and 9-10, the hinge 25 operation is regulated by an opening assembly 48 for biasing the press assembly 12 in an open position and a limiting assembly 50 for limiting the amount the press assembly 12 opens after engagement. The opening assembly 48 biases the distal press members in an open position. The opening assembly 48 includes a first arm 45 for cooperating with a spring member 46 to urge the proximal press, for example, proximally (upwardly). The arm 45, as shown, is defined by a linear member extending downwardly from proximal press member 22 and having a length and a position so as to cooperate with, that is, abut, the spring member 46. Spring member 46, as shown, is defined by an upwardly extending member from said distal press member 24 and formed of a material having an inherent degree of resilience, such as an elastomeric material, for example, polypropylene. As such, when the proximal press member 22 is compressed distally (downwardly) so as to close the proximal press member 22 and distal press member 24, the arm 45 urges the spring member 46 laterally, away from the hinge 25 wherein the arm 45 is positioned laterally, in the direction of the hinge 25, behind the spring member 46. The spring member 46 is biased in its original position and thereby urges the arm 45 upward as it reverts to its original position. This has the effect of the proximal press member 22 being biased in an open position.

Figure 5A:
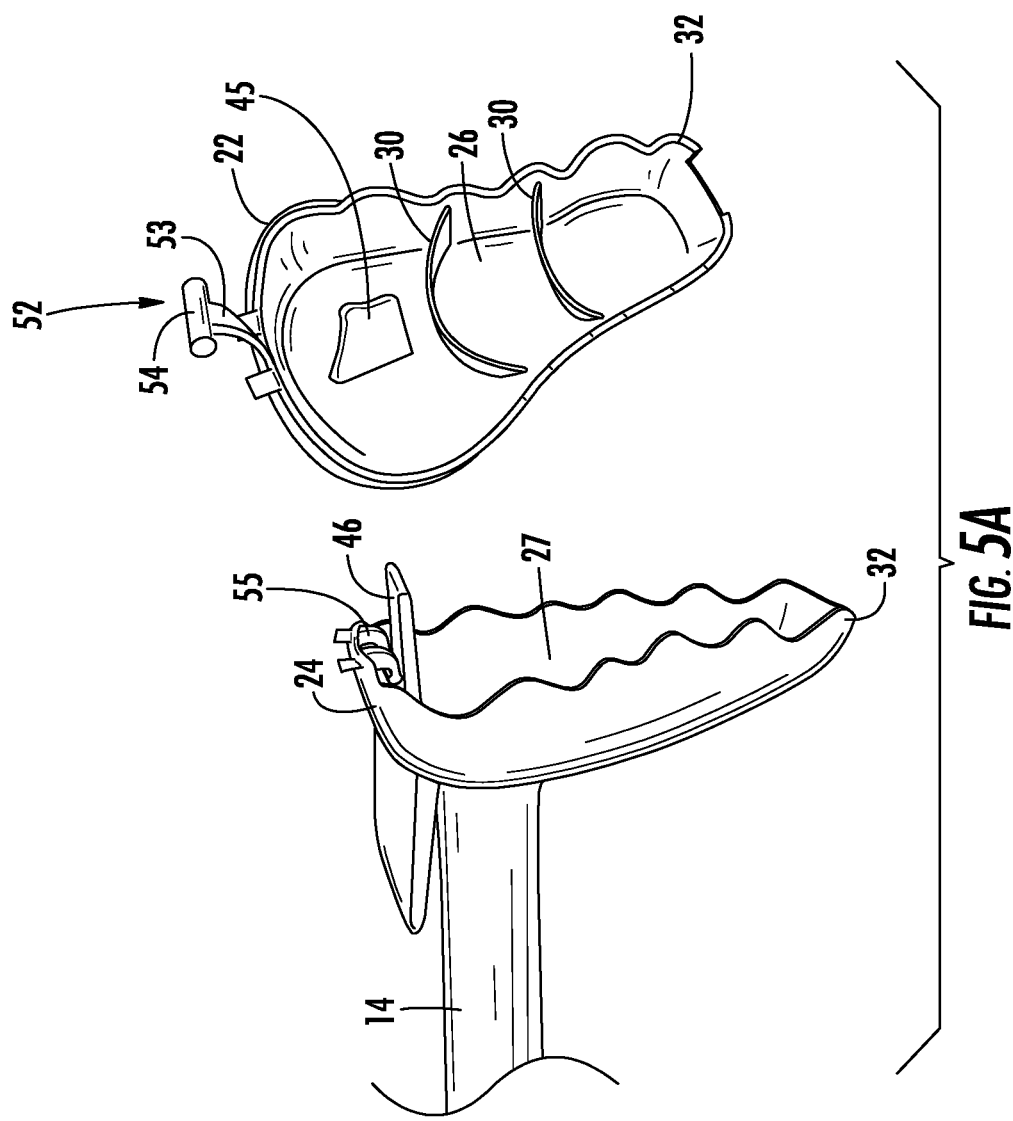
FIG. 5A is a disassembled view of the fruit press members.
Figure 5B:
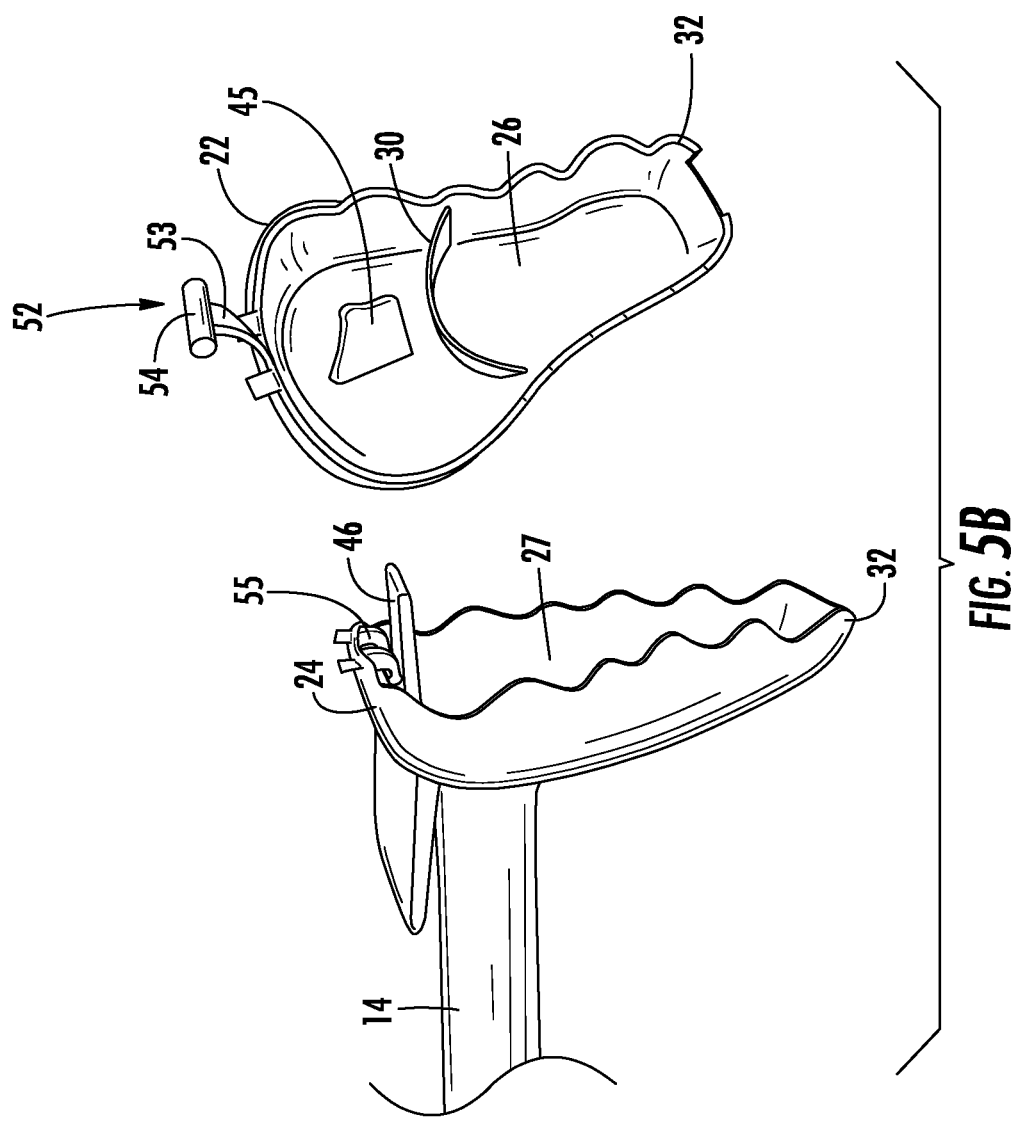
FIG. 5B is a disassembled view of the fruit press members according to an aspect of the invention.

The limiting assembly 50 limits the extent to which the proximal 22 and distal 24 press members open relative to one another after engagement, such as its initial use. This is beneficial in retaining the pressed citrus wedge 18 after it has been squeezed. The limiting assembly 50 includes a catch 52 for cooperating with a toggle 55—which engage one another to limit the degree of opening, for example, less than 100 degrees, or between 60-80 degrees. The catch 52 is defined by a generally longitudinally extending second arm 53 and a perpendicularly extending clip 54. The toggle 55 is defined by a pair of downwardly extending arcuate flanges 55 configured for receipt of the clip 54 so as to engage the toggle 55. The length of the second arm 53 is selected to permit the proximal press member 52 to pivot about hinge 25 a predetermined distance. Further pivotal movement of the proximal press member 22 is limited, however, when the clip 54 engages the flanges 55. The limiting assembly 50 and opening assembly 48 may both be provided as shown in FIGS. 5-7, one or the other may be provided, or neither may be provided as shown in FIGS. 8A-8B.

The proximal press member 22 defines an upper cavity 26 and the distal press member 24 defines lower cavity 27, as shown in FIG. 5, which is configured for receipt of the fruit wedge 18. As shown, the cavity 26 is generally concave, however, the cavity 26 may be defined by any geometric shape. The distal press member 24 defines a cavity 27 also configured for receipt of the fruit wedge 18. This cavity 27 is also shown as concave but may be defined by any geometric shape. It is also contemplated that only one cavity, the upper cavity 26 or lower cavity 27, defines a cavity for receipt of the fruit 18 wherein the opposing press member may be substantially flat.

According to the aspect shown, the distal press member 24 is not moveable, during the pressing operation, relative to the dispenser 14. The proximal press member 22 is hingedly connected by hinge 25 to the distal press member 24 and thus pivots about the hinge 25 to open and close the press assembly 12. In the open position, the fruit wedge 18 to be pressed is received within the cavities 26, 27 defined by the proximal 22 and distal 24 press members. The cavities 26, 27 are configured to receive the fruit wedge 28 and to secure it in place during the pressing operation. This is due, at least in part, to the configuration of the open ends of the proximal and distal members 22, 24 which each define a lip 32 for retaining the fruit wedge 18.

According one aspect of the present disclosure, the proximal press member 22 further defines a flange 30 for providing additional support or the primary support to the fruit wedge 18. The flange 30 extends inwardly from the proximal press member 22 and into the upper cavity 26. As shown in FIGS. 5A, 5B 8, the flange 30 is generally arcuate, but it may be presented in any configuration, including linear, to provide a stop for the fruit wedge 18. The flange 30 provides an abutting surface for the fruit wedge 18 to position the wedge 18 for appropriate pressing and to keep the wedge 18 from moving, for example, sliding, during the pressing operation. Thus, it is envisioned that the upper proximal lip 32 may be unnecessary when the proximal press member 22 includes the flange 30. FIG. 5B illustrates the proximal press member 22 defining at least two flanges 30 for supporting the fruit wedge 18.

Figure 4:
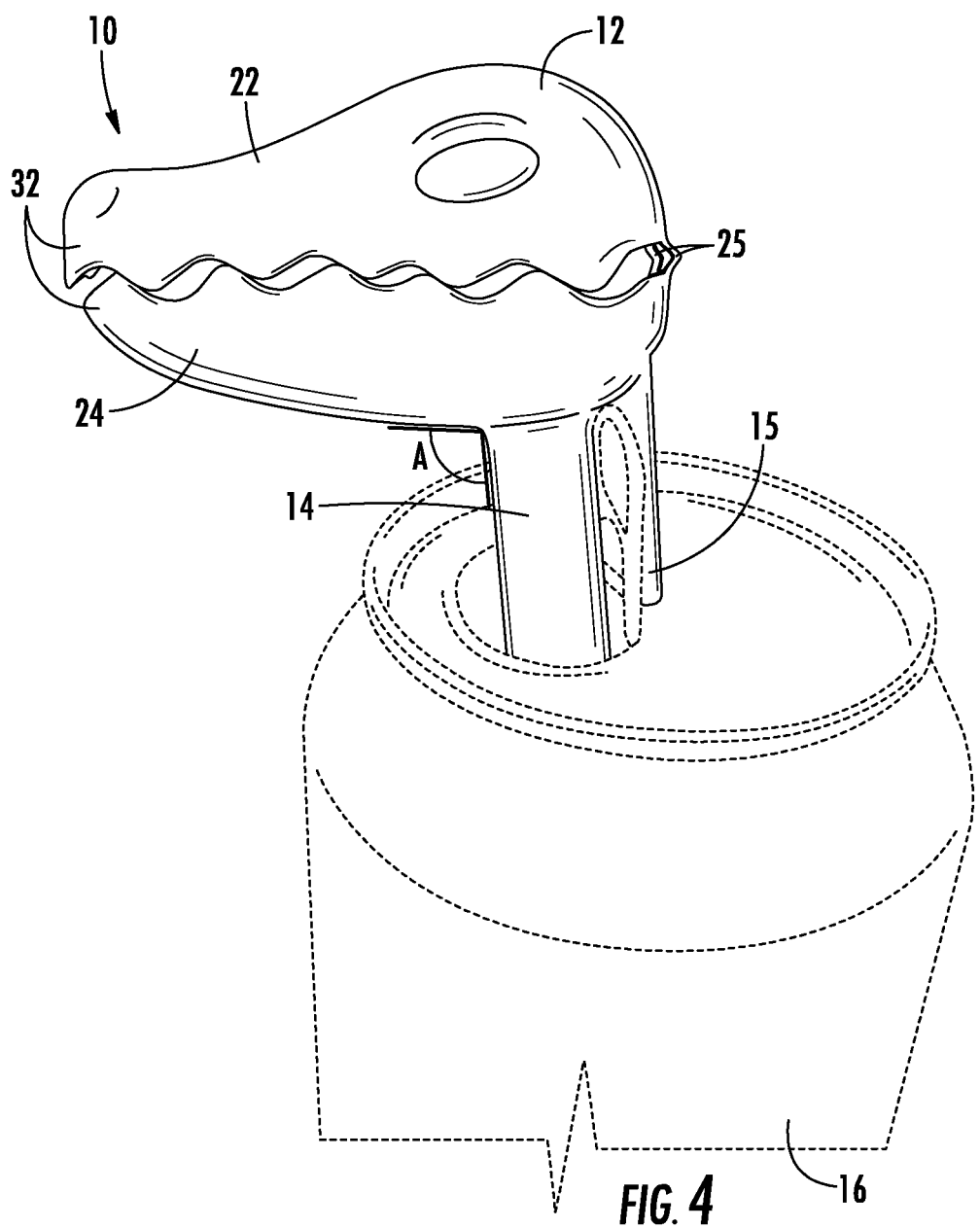
FIG. 4 is a perspective view of the fruit press device for dispensing fruit juice to a beverage positioned in a can illustrating the fruit press in a closed position.

The dispenser 14 is a generally longitudinal, hollow member defining a longitudinal central lumen having open proximal 34 and distal 35 ends. The dispenser 14 is of sufficient length to support the press assembly 12 within the beverage receptacle, and may be of a predetermined length depending upon the size of the beverage receptacle, such as between 50 mm and 80 mm, for example, between 55 mm and 75 mm. The distal press member 24 defines an aperture 36 shown in FIGS. 6 and 8B. The aperture 36 is positioned adjacent the rear of the distal press member 24 in substantial alignment with the open proximal end 34 of the dispenser 14 to permit pressed juices to flow from the press assembly 12, into the dispenser 14, and into the beverage. To facilitate juice flow, a portion of the lower cavity 27 of the distal press member 24 defines an angled surface with a predetermined slope to encourage pressed juices to enter the dispenser 14. The distal-most portion of the distal press member 24 is positioned at an angle A relative to the dispenser proximal end 34 as shown in FIGS. 2 and 4. This angle is greater than or equal to 90 degrees.

The securing member 15 according to one aspect shown in FIGS. 1-4 and 6-8 and 11, is defined by a clip 15 for cooperating with the beverage receptacle 16 to support the fruit press device 10. The clip 15 is defined by a longitudinally extending member having a proximal end extending from the distal press member 24 and extending along a portion of the dispenser 14, substantially parallel thereto. The transverse distance defined between the dispenser 14 and the clip 15 is sufficient to receive a portion of the beverage receptacle 16, i.e., the receptacle lip 20. For example, the distance is sufficient to receive the width of bottle sidewall of FIG. 1, the width of the glass of FIG. 3, and/or the width of the can tab of FIG. 4. The width defined between the dispenser 14 and clip 15 is at least 1 mm, such as between 2 and 6 mm. The length of the clip 15 is sufficient to support the fruit press device 12, at least 10 mm, such as at least 20 mm. The width of the clip is at least 10 mm, such as at least 13 mm.

As shown, the clip 15 is substantially planar, but non-planar configurations are within the scope of this disclosure. The clip 15 is formed of a material having an inherent degree of flexibility, including a polymeric material, such as PVC which may be formed as food safe.

The method of pressing the fruit wedge 18 with the fruit press device 10 as described herein includes the steps of positioning the dispenser 14 into the beverage receptacle 16 and opening the press assembly 12, if necessary, depending upon the size of the fruit 18, by pivoting the proximal press member 22 upward about hinge 25. If the opening assembly 48 is provided, this step may be obviated. Positioning the fruit wedge 18 into the upper 26 and lower 27 cavities wherein a bottom portion of the fruit 18 is supported by the distal press member 24 and its lip 32 and an upper portion of the fruit wedge 18 is supported by the proximal press member 22 and its lip 32. According to one aspect, the upper portion of the fruit wedge 18 is positioned to abut the flange 30. The proximal 22 and distal 24 press members are then squeezed wherein the proximal press member 22 rotates downward, pressing the fruit wedge 18 as shown. The pressed juice pools within the lower cavity 27 of the distal press member 24 and, due to gravitational forces, pass through the aperture 36 and into the lumen of the dispenser 14 before exiting its distal end 35 and into the beverage and/or beverage receptacle 16. When the limiting assembly 48 is provided, the pressed fruit 18 remains engaged with the press assembly 12 in that the opening of the device is limited to a predetermined degree. Thereafter, the fruit press device 10 with the pressed fruit 18 remains intact for easy removal. The device 10 is then removed with the squeezed fruit wedge 18 housed within the press assembly 12. The process may then be repeated to further press the fruit wedge 18 or for a new fruit wedge 18. The dispenser 14 may be used to stir the beverage. Optionally, the fruit press device 10 may to rotated with the clip 15 facing inward and the fruit press 12 opening facing outward and the dispenser extending on the outside of the beverage receptacle 16.

Figure 9:
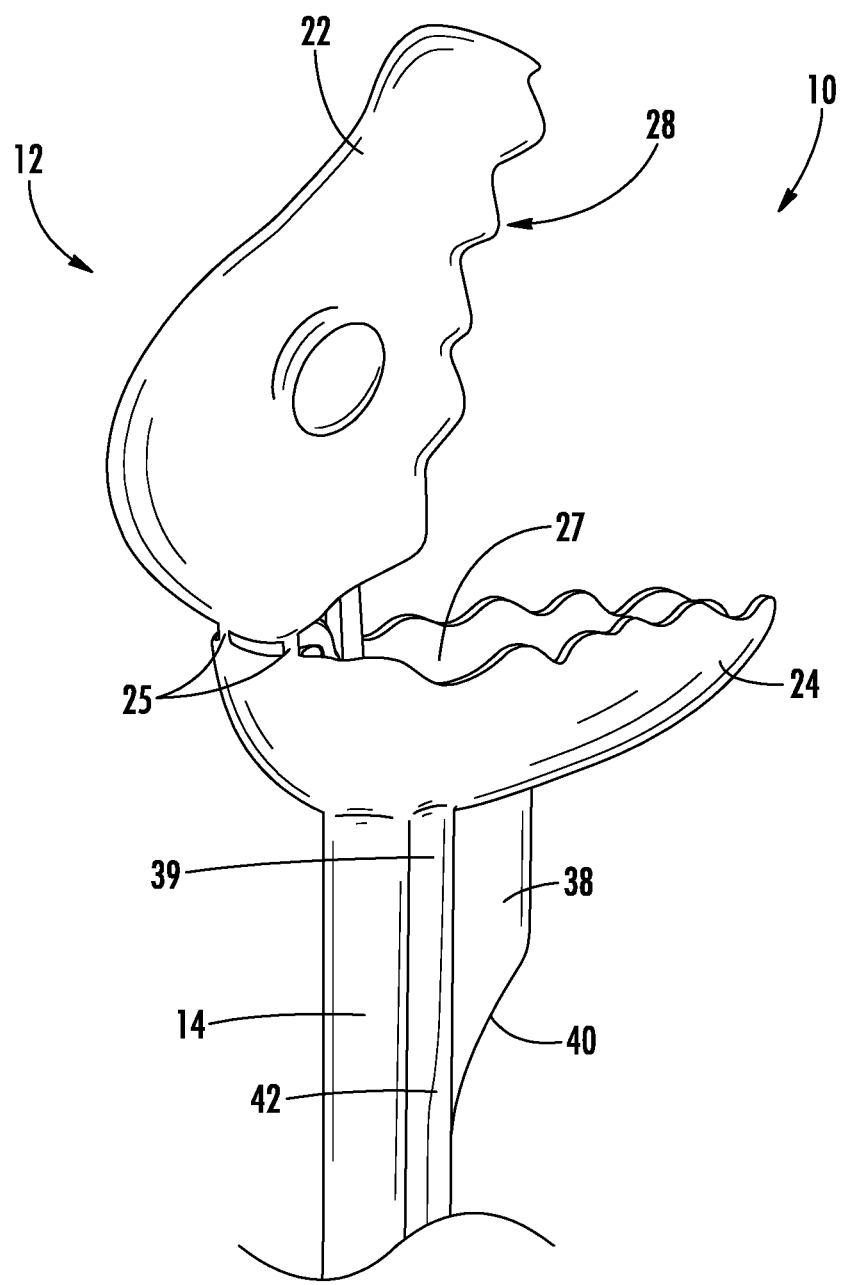
FIG. 9 is a perspective view of the fruit press device for dispensing fruit juice to a beverage for use in a beverage bottle according to another aspect.
Figure 10:
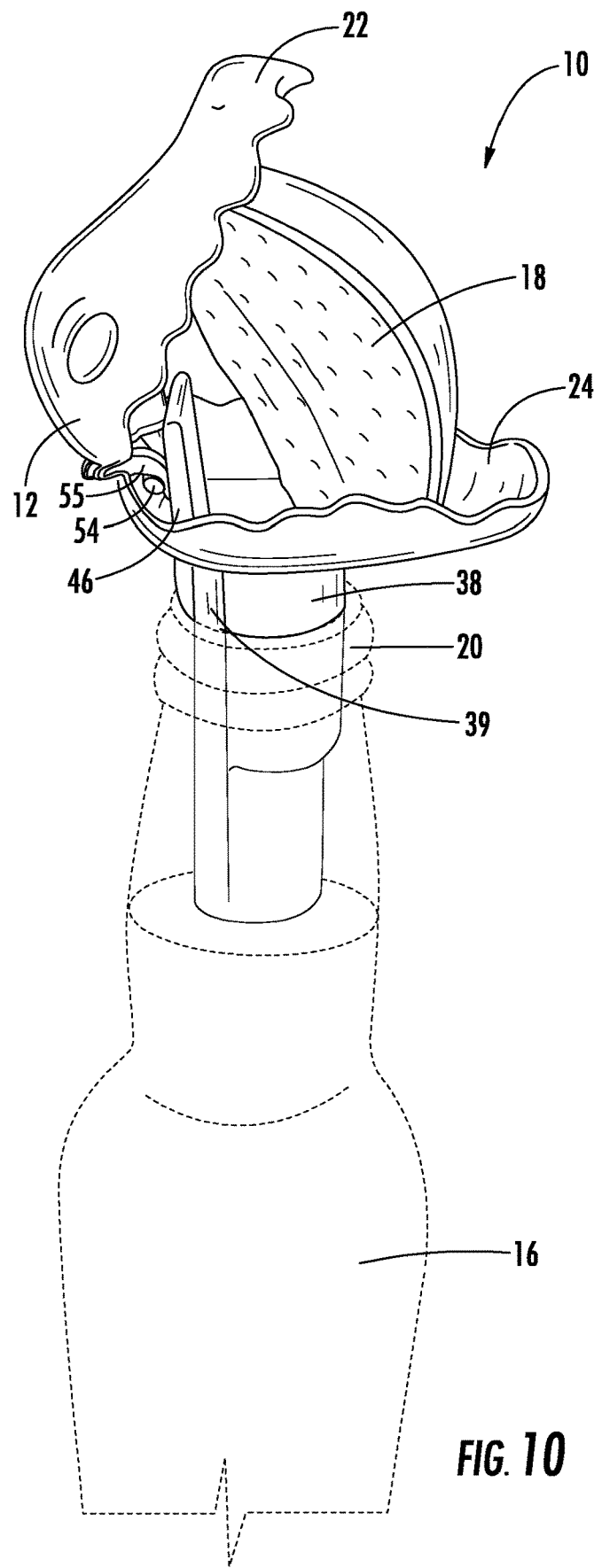
FIG. 10 is a side view of the fruit press device of FIG. 10.
Figure 11:
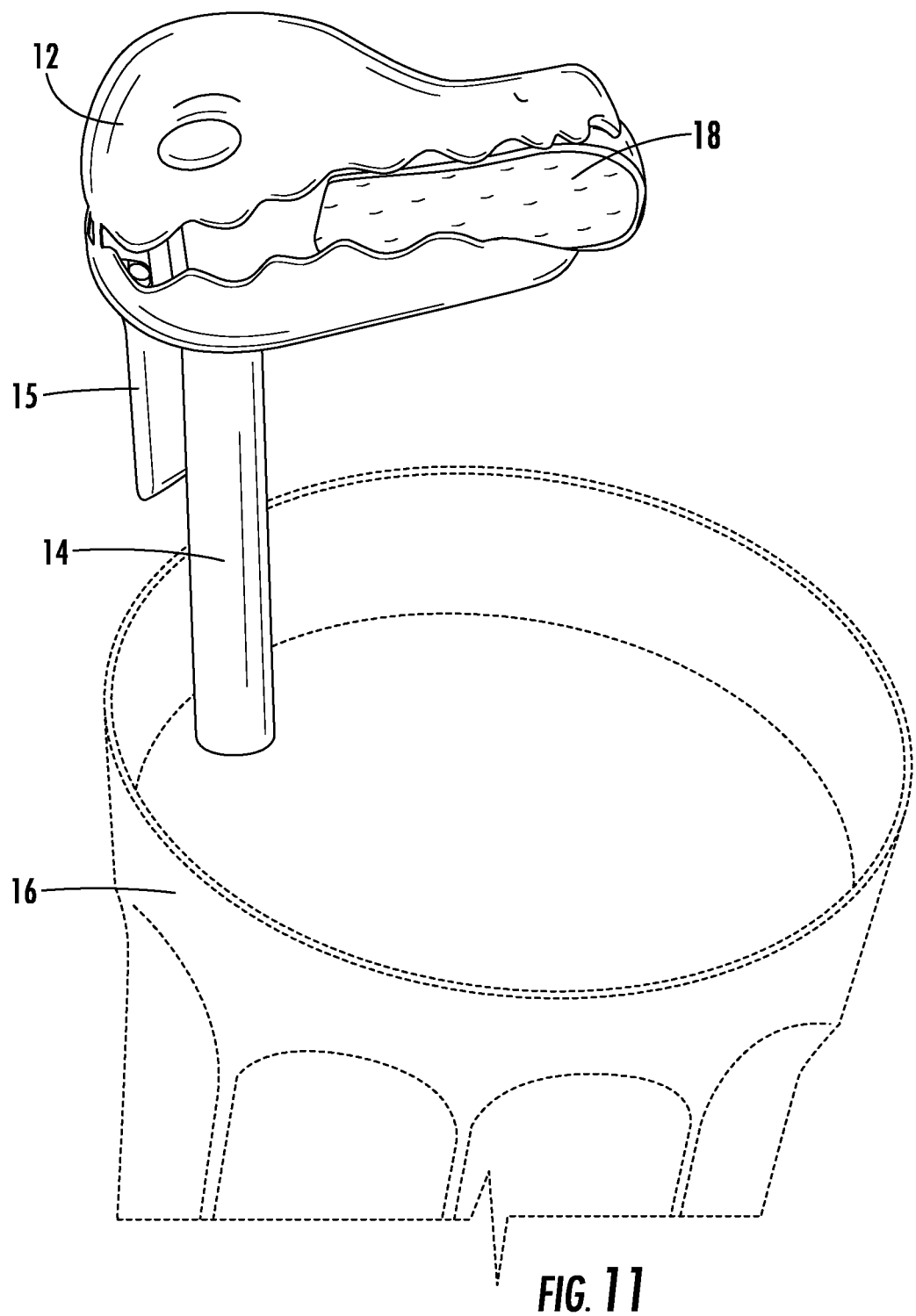
FIG. 11 is a perspective view of the fruit press device for dispensing fruit juice to a beverage for use in a drinking glass.

Another aspect of the present invention is shown in FIGS. 5, 9 and 10 for use with a bottle as the beverage receptacle 16. The securing member 15 includes at least one stabilizer in the form of a first fin 38 extending outwardly from the dispenser 14 outer surface, transverse to the longitudinal access. The fin 38 includes a tapered distal portion 40. The insertion of the device 10 into the bottle 16 is facilitated by the tapered distal portion 40. Once inserted, the device 10 is lodged within the bottle opening as the fin 38 contacts the bottle proximal side walls to support the device 10 in an upright position. According to another aspect, one or more, such as a pair as shown, of second fins 39 extend outwardly from the outer surface of the dispenser 14, transverse to the longitudinal axis. The second fins 39 shown are on diametrically opposed side surfaces of the dispenser 14 to further support the device 10 within the bottle 16. The second fins 39 also include a distal tapered portion 42. It is within the scope of the present invention to provide any number of fins 38 and/or 39 or no fins. A flange (not shown) may also be provided which extends substantially circumferentially around the dispenser 14 to support the device 10 within the bottle 16.

While exemplary embodiments have been shown and described above for the purpose of disclosure, modifications to the disclosed embodiments may occur to those skilled in the art. The disclosure, therefore, is not limited to the above precise embodiments and that changes may be made without departing from its spirit and scope.

What is claimed is:

1. A fruit press device for pressing fruit to dispense fruit juice into a beverage receptacle comprising:
   a fruit press assembly and a juice dispenser, said juice dispenser having a proximal and distal end, said fruit press assembly being operatively connected to said juice dispenser proximal end to transfer pressed juice from said press assembly to said juice dispenser and said juice dispenser distal end being configured to dispense pressed juice;

said fruit press assembly comprising a proximal press member and a distal press member defining a fruit receiving cavity therebetween, and at least one hinge connecting rear edges of said proximal press member and said distal press member wherein said hinge connects said rear edges of said proximal and distal press member and said proximal member pivots about said at least one hinge to open said cavity adjacent said front edges of said proximal and distal press members;

said proximal press member defining an upper cavity and said distal press member defining a lower cavity, said cavities configured for receipt of the fruit wherein said distal press member defines an aperture along said lower cavity wherein said aperture is positioned adjacent said dispenser proximal end to dispense pressed juice; and a securing member for securing said fruit press device to a receptacle.

2. The fruit press device according to claim 1 wherein said distal press member defines a lip configured to retain said fruit when pressed.

3. The fruit press device according to claim 1 wherein said securing member comprises a clip extending longitudinally and downwardly from said distal press member adjacent said juice dispenser and having at least a portion extending parallel thereto a predetermined horizontal distance, said distance selected to receive said beverage receptacle between said clip and said juice dispenser wherein said clip is configured to support said fruit press device on said receptacle and said dispenser is configured to extend from said fruit press assembly within said receptacle.

4. The fruit press device according to claim 1 wherein said securing member comprises a stabilizer including a fin extending radially outwardly from said juice dispenser and extending along a longitudinal length of said juice dispenser adjacent a proximal end of said juice dispenser adjacent said distal press member wherein said fin has upper width and a bottom width measured radially outward and said bottom width is less than said upper width so as to be tapered and configured to frictionally fit within the beverage receptacle opening.

5. The fruit press device according to claim 1 wherein a bottom surface of said lower cavity defines a sloped surface adjacent said aperture wherein said sloped surface is greater than 90 degrees relative to a horizontal axis to permit pressed juices to enter said aperture and into said juice dispenser.

6. The fruit press device according to claim 1 wherein said proximal press member upper cavity is concave.

7. The fruit press device according to claim 1 further comprising at least on flange extending distally from said proximal press member and extending into said upper cavity, said flange configured to support the fruit positioned within said fruit press assembly.

8. The fruit press device according to claim 7 wherein said flange is arcuate with a curvature facing away from said hinge.

9. The fruit press device according to claim 7 further comprising at least two of said flanges.

10. The fruit press device according to claim 1 wherein said fruit press assembly comprises at least two of said hinges.

11. The fruit press device according to claim 1 wherein said fruit press assembly comprises an opening assembly for biasing said fruit press assembly in at least a partially open position.

12. The fruit press device according to claim 11 wherein said opening assembly comprises a spring member for biasing said opening assembly.

13. The fruit press device according to claim 12 wherein said spring member extends proximally from said distal press member and extends within said lower cavity.

14. The fruit press device according to claim 13 wherein said opening assembly further comprises a distally extending arm extending within said upper cavity and configured to cooperate with said spring member to urge said arm proximally.

15. The fruit press device according to claim 1 further comprising a limiting assembly for limiting relative movement of said distal and proximal press member from an open position after initial engagement.

16. The fruit press device according to claim 15 wherein said relative movement is less than 100 degrees relative to the horizontal axis.

17. The fruit press device according to claim 15 wherein said limiting assembly is positioned adjacent said hinge within said fruit press assembly and comprises a catch positioned on said proximal press member for cooperating with a toggle positioned on said distal press member wherein initial pressing of said fruit press assembly engages said catch to said toggle.

18. The fruit press device according to claim 17 wherein said catch comprises an arm having a predetermined length, said predetermined length defining the degree of opening of said proximal and distal press members.

19. A method for dispensing pressed fruit juice from a fruit press device and into a beverage comprising the steps of:

providing a fruit press device having a fruit press assembly comprising a proximal and distal press member connected by a hinge and defining a fruit receiving cavity therebetween, wherein said proximal press member pivots about said hinge and comprising a juice dispenser configured to dispense pressed juice from said fruit press assembly;

positioning the fruit press device into a beverage receptacle wherein the juice dispenser is positioned within the receptacle;

securing the fruit press device to the beverage receptacle;

pivoting the proximal press member to open said fruit receiving cavity;

inserting fruit into the fruit receiving cavity;

pressing the fruit press assembly by pivoting the proximal press member toward the distal press member to produce pressed juice;

dispensing the pressed juice from said juice dispenser; and retaining the pressed fruit within the fruit press assembly.

20. The method according to claim 19 further comprising the step of limiting the degree in which the fruit press assembly is opened after initial engagement.

21. The method according to claim 19 further comprising the step of biasing the fruit press assembly in an open position.

22. The fruit press according to claim 1 wherein said distal press member lower cavity is concave.

* * * * *